US007621704B2

(12) United States Patent
Schmitt et al.

(10) Patent No.: US 7,621,704 B2

(45) Date of Patent: Nov. 24, 2009

(54) HOLD-DOWN DEVICE

(75) Inventors: Rudolf Schmitt, Pleckhausen (DE); Walter Mees, Kirchen (DE); Jörg Schornstein, Kreuztal (DE); Jochen Weniger, Freudenberg (DE)

(73) Assignee: Albrecht Baumer GmbH & Co. KG, Freudenberg (DE)

( * ) Notice: Subject to any disclaimer, the term of this patent is extended or adjusted under 35 U.S.C. 154(b) by 550 days.

(21) Appl. No.: 11/587,415

(22) PCT Filed: Apr. 21, 2006

(86) PCT No.: PCT/EP2006/003658

§ 371 (c)(1), (2), (4) Date: Oct. 23, 2006

(87) PCT Pub. No.: WO2006/117086

PCT Pub. Date: Nov. 9, 2006

(65) Prior Publication Data

US 2009/0163338 A1 Jun. 25, 2009

(30) Foreign Application Priority Data

Apr. 29, 2005 (DE) ....................... 10 2005 020 468

(51) Int. Cl.
*B23C 1/00* (2006.01)
*B23Q 3/00* (2006.01)

(52) U.S. Cl. ....................... 409/131; 409/164; 409/159; 409/161; 409/225; 409/212; 83/452; 83/466.1; 269/289 R; 269/91

(58) Field of Classification Search ................. 409/163, 409/164, 145, 159, 161, 162, 172, 173, 189, 409/197, 205, 225, 202, 212, 131–132; 408/69, 408/70, 72 R, 95, 87–88, 98, 103, 109; 83/451, 83/452, 466.1, 453–456; 269/289 R, 37, 269/91, 73, 228; 219/221, 69.12
See application file for complete search history.

(56) References Cited

U.S. PATENT DOCUMENTS

| | | | | |
|---|---|---|---|---|
| 4,610,582 | A * | 9/1986 | Amos et al. | 409/163 |
| 5,050,472 | A | 9/1991 | Pötzsch | |
| 5,299,483 | A | 4/1994 | Ber-Fong | |
| 5,379,510 | A * | 1/1995 | Berge | 409/163 |

(Continued)

FOREIGN PATENT DOCUMENTS

| | | |
|---|---|---|
| DE | 1016234 | 9/1957 |

(Continued)

*Primary Examiner*—Erica E Cadugan
(74) *Attorney, Agent, or Firm*—Andrew Wilford

(57) ABSTRACT

A machine for cutting a block of soft material has a machine frame, a table adapted to support the soft-material block adjacent the machine frame, a center support shiftable transversely on the machine frame relative to the table, and a cutting tool carried on and transversely shiftable with the center support and engageable with the block on the table for longitudinally cutting the block. A hold-down device has a hold-down frame vertically displaceable on the machine frame above the table and a plurality of longitudinally shiftable hold-down plates longitudinally shiftable on the hold-down frame and separated by longitudinally extending gaps at least one which is transversely wider than the center support. The center support projects vertically through the one gap.

10 Claims, 2 Drawing Sheets

U.S. PATENT DOCUMENTS

| | | | | | |
|---|---|---|---|---|---|
| 5,524,328 | A * | 6/1996 | Hardesty | .................... | 409/163 |
| 6,832,879 | B2 * | 12/2004 | Wassmer | .................... | 409/197 |
| 7,272,882 | B1 * | 9/2007 | Onsrud | ....................... | 409/163 |
| 2003/0070524 | A1 | 4/2003 | Rotter | | |

FOREIGN PATENT DOCUMENTS

| | | |
|---|---|---|
| DE | 2156687 | 5/1973 |
| FR | 2 787 376 | 6/2000 |

* cited by examiner

Fig.1
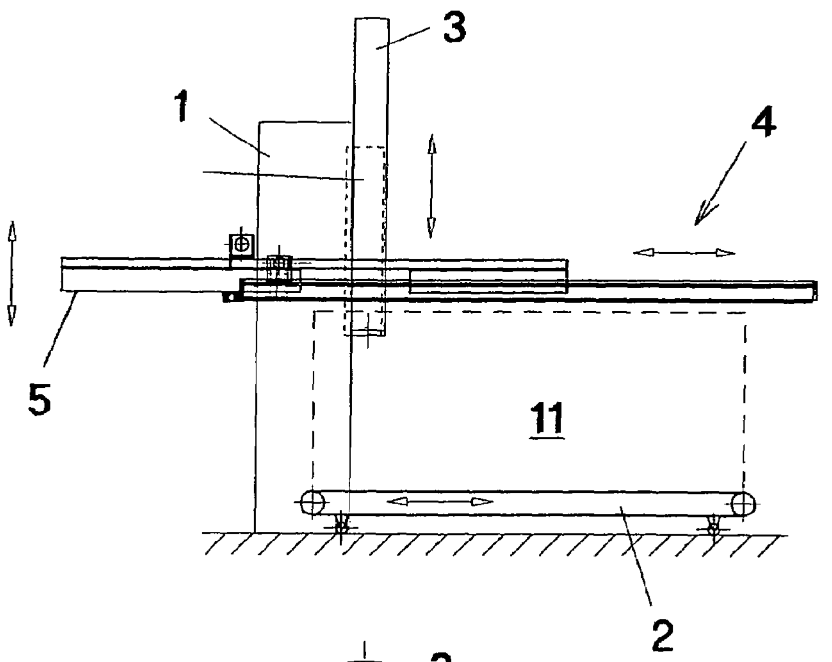
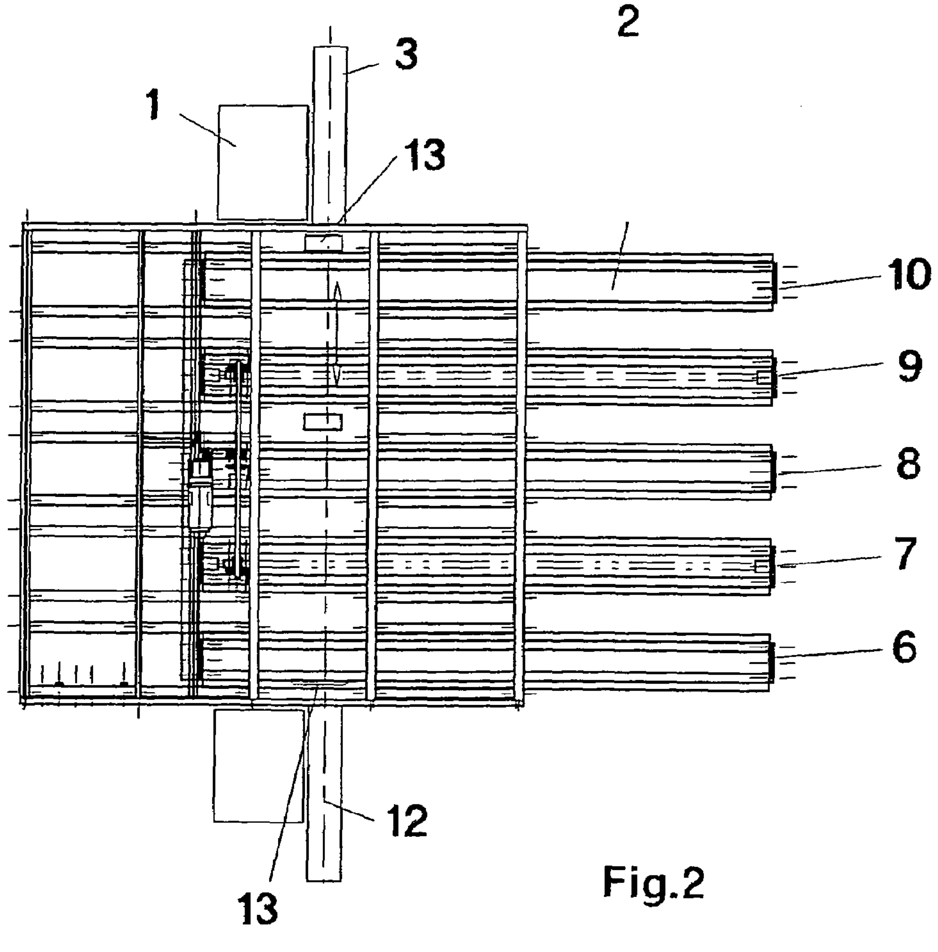
Fig.2

Fig.3
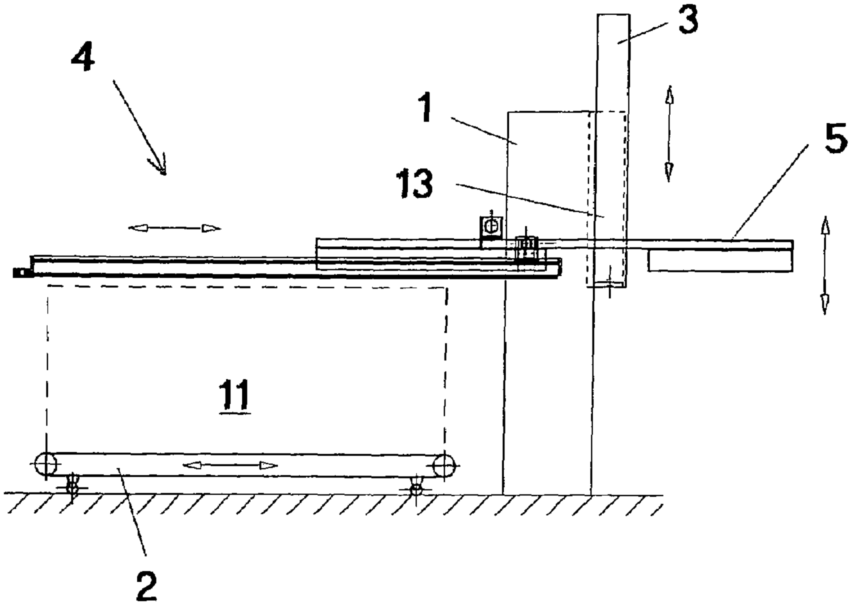
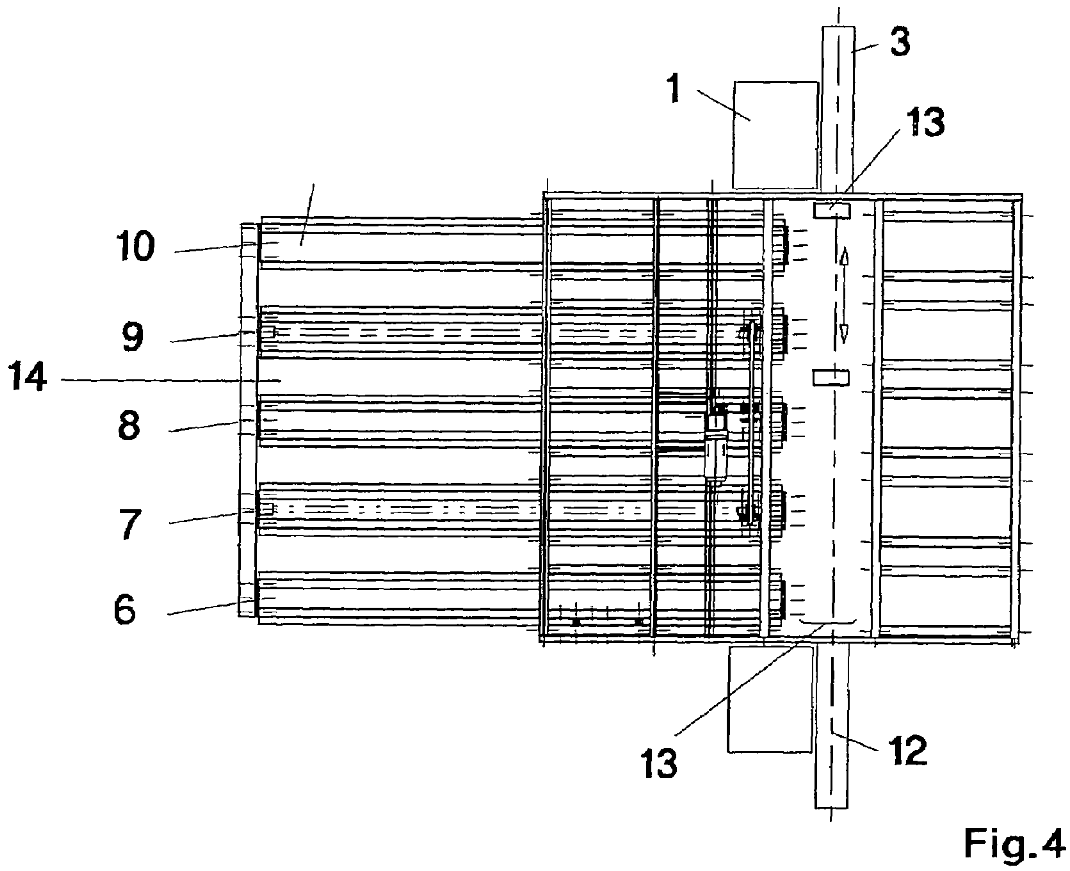
Fig.4

HOLD-DOWN DEVICE

CROSS REFERENCE TO RELATED APPLICATIONS

This application is the US national phase of PCT application PCT/EP2006/003658, filed 21 Apr. 2006, published 9 Nov. 2006 as WO2006/117086, and claiming the priority of German patent application 102005020468.6 itself filed 29 Apr. 2005.

FIELD OF THE INVENTION

The invention relates to a hold-down device for machines in which material blocks made of soft material are machined and/or processed, preferably for foam contour-cutting machines comprising hold-down plates vertically adjustable relative to and parallel to a table, the cutting machine having for a cutting tool carried on at least one center support that can be positioned anywhere along the width of the material block and that rides on two rails of a machine frame. The invention furthermore relates to a method for operating a hold-down device.

BACKGROUND OF THE INVENTION

In foam-cutting machines, the horizontally, vertically or basically randomly oriented cutting tool produces displacement forces in the workpiece to be cut upon entering the foam and also during cutting. The forces are produced, among other things, by the friction between the tool and the foam as forces in the oscillation and/or cutting channel longitudinal directions as well as by the wedging effect of the tool acting as sliding forces in the advancing direction. Both force directions are oriented substantially perpendicular to each other. The forces produce at least local shifts of the foam, which ultimately result in inaccuracies of the cut line. The extent of the shift depends on different factors, including the material properties of the workpiece and the geometric configuration of the blade of the tool. Due to the operating principle, shifts in the upper region of the loose foam block are greater than in the lower region close to the contact location on the table. This is due to the fact that the table guides the foam, which in the region of the interface between the foam and table under high friction results in very accurate positioning and accordingly small shifts. The further away from the boundary layer the cut is made, the less the effect of the counter-pressure of the table, which means that the shifts increase with increasing distance from the table.

So as to counteract these shifts, a pressure pad is engaged with the foam, which with respect to the shifts has a similar effect as the table beneath the foam. This pressure pad is referred to as a hold-down device.

Thus hold-down devices in foam-cutting machines are known. They are used to clamp the foam block or a foam-plate stack between the table and the hold-down device in order to stabilize and steady the material on the table enough so that during cutting, particularly during contour cutting, the material block experiences minimal deflection by the cutting tool and/or minimal inherent vibration, thus allowing exact contour cuts.

Cutting machines with hold-down devices have been developed that are connected directly to the table and comprise hold-down plates held in a frame. This design makes the table very heavy, which is disadvantageous for the acceleration response of movable tables. Furthermore, the high frame may result in undesirable vibrations while advancing during the cut, which in turn negatively influence cutting accuracy. These cutting machines comprise a center support that shortens the free bending length of the blade that depending on the extent of shortening results in significantly reduced bending of the cutting tool. This largely reduces cutting tolerances that are a function of the operating principle and result from the bending of the cutting tool. If with such a cutting machine the center support needs to be moved into a position more favorable for cutting, the hold-down plates located in the travel path have to be removed from the frame and reinstalled in the new location after displacement of the center support. This process is cumbersome and particularly time-consuming.

For this reason, hold-down devices have been proposed that are provided with hold-down rollers. The hold-down devices are mounted on the machine frame so that their height is adjustable. The rollers, at least in the region of the center support, are spaced apart to ensure that the center support can be displaced transversely without difficulty. The disadvantage with hold-down rollers, however, is that the soft material blocks are not sufficiently supported, at least when it comes to some cutting applications. Instead of surface contact of the hold-down device, the rollers only have line contact. The soft material cannot be held down between the rollers. In the event of complicated contour cuts, this small contact surface may result in scrap during cutting.

OBJECT OF THE INVENTION

It is therefore the object of the invention to further develop a hold-down device of this type such that, despite an optimally large contact area, the automatic change of the blocks with corresponding transverse displacement of the center supports as well as a lower weight of the table and fewer undesirable vibrations during operation are guaranteed.

SUMMARY OF THE INVENTION

To achieve this object, the invention proposes to provide the hold-down device with support elements that are vertically adjustably mounted on the rails, the support elements carrying a hold-down frame, the hold-down plates being guided longitudinally displaceably in the hold-down frame, and the hold-down plates being at least in the region of the center support spaced apart by a distance that exceeds the width of the center support so as to accommodate the center support between the plates.

Since the hold-down plates are longitudinally displaceable, they can be displaced into a position outside an area of possible collision with the center support.

Here the center support can be displaced transversely. In this position of the hold-down plates, the table is furthermore particularly easy to access for loading and unloading. Once loaded, the hold-down plates can be displaced back again. However, attention must be paid that the hold-down plates are spaced apart in the region of the center support. This creates the advantage of the material blocks being supported across a large surface, at least in the region above the cutting tool, which is significantly better and more effective than support by hold-down rollers. Any displacement of the material block negatively affecting the cut, as occurs with hold-down rollers, can be excluded. Prior trimming of the top surface of the material block, as is required for hold-down rollers to create a level contact surface for the rollers, is not required when using the hold-down plates. Furthermore, the advantage is gained of automatic displacement of the center support since the hold-down plates do not have to be manually removed, reinserted and maybe even readjusted. The hold-down plates also allow the processing of small individual blocks that cannot be processed with hold-down rollers, or can only be processed insufficiently.

The mechanical connection of the hold-down device occurs independently from the table on a separate height-adjustable part. This way the table remains unaffected by the additional weight of the hold-down device, so that the position control system is not influenced. Also potential longitudinal vibrations are avoided that would in turn negatively affect cutting tolerances.

The table can be stationary or displaceable, it can have loading belts or not have them, or it can even be configured as a table belt system, in which a stationary or displaceable table is provided with at least one conveyor belt for displacing and positioning the foam block. If either the table as a whole or the belt of the table belt system effect the displacement and/or positioning functions, the table represents one of the NC axes of the foam-cutting machines. In the case of a stationary table, the correspondingly displaceable cutting assembly typically represents an NC axis. The second NC axis is typically defined by the vertical displacement of the cutting assembly or the cutting tool. Typically either an oscillating blade, a revolving blade or a wire is provided on the cutting assembly, which blade or wire acts as the cutting tool, hereinafter also only referred to as the blade, and the rotation of which represents the third NC axis. The rotation means that in the cutting region the cutting edge of the blade defines the cutting direction; this occurs, for example, through the continuous rotation of the revolving blade or continuous back and forth movements of the oscillating blade. Due to the wire's geometry, it does not have to be rotated, but instead is pulled through the foam in any random orientation.

It has proven useful if the hold-down plates are arranged at a fixed grid spacing between the hold-down plate and the gap and if the hold-down device is transversely displaceable in this fixed grid spacing. This results in easy machine control, for which the corresponding grid can be defined. The number and arrangement of the hold-down plates can almost be freely set prior to the construction of the machine, however it cannot be varied easily in the fully assembled machine. The hold-down plates should be arranged such that gaps of typically 130 mm, for example, are created between them. One of these gaps accommodates the center support whose lower tip comprises a blade guide.

So as to be able to have more freedom in adjusting the orientation of the hold-down plates, it is also conceivable to fasten the hold-down plates detachably on the hold-down frame and mount them so that they can be displaced transversely relative to each other. As a result, the gap required for the hold-down device can be set at any random location by displacing the hold-down plates.

It is advantageous if the hold-down plates are of adjustable width. Such preferably automatically telescoping hold-down plates ensure even more flexible adjustment of the hold-down surface and the gap for receiving the intermediate support.

In a hold-down device with a longitudinally displaceable table and/or a table with a table belt system, it has proven useful to provide a switchable synchronization of the longitudinal displacement drives for the table and/or the belt system and for the hold-down plates. This guarantees that the material blocks can be handled between the table and the hold-down device without relative movement.

It is possible to ensure synchronization mechanically. The longitudinal displacement drive of the table and the longitudinal displacement drive of the hold-down plates have to be connected with each other via couplings. It is advantageous, however, if the synchronization is implemented electrically or electronically, for example based on the mother/child system. The table being the mother emits appropriate pulses to the drive of the hold-down plates, acting as the child.

It has proven useful if the hold-down device can be lowered onto the material block by regulating the position and/or force. This way, depending on the strength of the material block to be processed, optimal hold-down pressures can be adjusted.

BRIEF DESCRIPTION OF THE DRAWING

The invention will be explained in more detail based on the drawing. Therein:

FIG. 1 is a side view of a cutting machine with the hold-down device according to the invention during operation;

FIG. 2 is a top view according to FIG. 1;

FIG. 3 is a side view of the cutting machine with the hold-down device according to the invention during transverse displacement of the center support; and FIG. 4 is a top view according to FIG. 3.

SPECIFIC DESCRIPTION

The figures show a machine frame 1 and a table 2 of a cutting machine. A cutting assembly 3 is vertically shiftably guided on the machine frame 1. A hold-down device 4 comprises support elements that are vertically adjustably guided on the machine frame 1. The support elements have a hold-down frame 5 that in turn carries longitudinally displaceable hold-down plates 6 to 10. The hold-down plates 6 to 10 are mounted above a material block 11. In addition to the mounts in the blade assembly 3, a blade 12 is held by a center support 13. The center support 13 is positioned in the region of one of the gaps 14 between the plates 6-10. This way, the hold-down plates 6 to 10 can be displaced longitudinally without coming into contact with the center support 13.

In FIGS. 3 and 4, the hold-down plates 6 to 10 have been displaced to the left. In this position of the hold-down plates 6 to 10, the center support 13 can be displaced transversely without difficulty. For changing the width of the material blocks 11, the center support 13 can be displaced from one to another of the gaps of the hold-down plates 6 to 10. After displacing the center support 13 into a different one of the gaps 14, the hold-down plates 6 to 10 can be displaced back into the position according to FIG. 1.

The invention claimed is:

1. In combination with a machine for cutting a block of soft material, the machine having:

a machine frame, a table adapted to support the soft-material block adjacent the machine frame, a center support shiftable transversely on the machine frame relative to the table, and a cutting tool carried on and transversely shiftable with the center support and engageable with the block on the table for longitudinally cutting the block, a hold-down device comprising:

a hold-down frame vertically displaceable on the machine frame above the table; and a plurality of longitudinally shiftable hold-down plates longitudinally shiftable on the hold-down frame and separated by longitudinally extending gaps at least one which is transversely wider than the center support, the center support projecting vertically through the one gap.

2. The combination defined in claim 1 wherein the table is longitudinally displaceable, the device further comprising drive means for synchronously longitudinally displacing the table and hold-down plates.

3. The combination according to claim 2 wherein the drive means is mechanical.

4. The combination according to claim 2, wherein the drive means electrically or electronically synchronizes longitudinal displacement of the plates and table.

5. A method for operating the combination according to claim 2, comprising the steps of during a cutting operation lowering the hold-down device onto the material block and operating the longitudinal displacement drive means for the table and for the hold-down plates, for changing the material blocks moving the hold-down device into an upper parking position, turning off the drive means, and shifting the material block longitudinally away from or toward the cutting tool by means of the driven table, and for adjusting the center support to a new material block width moving the hold-down device into the upper parking position and displacing the hold-down plates longitudinally out of a region of possible collision with the center support, then displacing the center support transversely to a corresponding gap between the hold-down plates and thereafter displacing the hold-down plates back longitudinally and down onto the material block and finally turning on the drive means.

6. The combination according to claim 1 wherein the hold-down plates are arrayed in a fixed grid spacing and the center support can be displaced transversely in the grid spacing.

7. The combination according to claim 1 wherein the hold-down plates are detachably mounted on the hold-down frame so that they can be displaced transversely relative to each other, and the center support can be displaced transversely between the hold-down plates to the extent of a transverse spacing of the gaps.

8. The combination according to claim 1 wherein the hold-down plates are of adjustable width and the center support can be displaced transversely to the extent of the gap produced by the width adjustment.

9. The combination according to claim 1 wherein the table is provided with a table belt system.

10. The combination according to claim 1, further comprising means for lowering the hold-down device onto the material block with a controllable position and/or force.

* * * * *